United States Patent [19]

Skinner

[11] 4,303,096

[45] Dec. 1, 1981

[54] VALVE FOR FUEL PUMPING APPARATUS

[75] Inventor: Robert T. J. Skinner, High Wycombe, England

[73] Assignee: Lucas Industries Limited, Birmingham, England

[21] Appl. No.: 202,759

[22] Filed: Oct. 31, 1980

[30] Foreign Application Priority Data

Jan. 18, 1980 [GB] United Kingdom ................. 1802/80

[51] Int. Cl.³ ............................................. F16K 15/06

[52] U.S. Cl. .................................... 137/512; 417/458; 417/504

[58] Field of Search ................ 137/512, 512.1, 516.11; 417/458, 504, 569, 571

[56] References Cited

U.S. PATENT DOCUMENTS

| | | | |
|---|---|---|---|
| 2,804,825 | 9/1957 | Mansfield | 417/458 X |
| 2,888,876 | 6/1959 | Nichols | 417/458 |
| 3,450,120 | 6/1969 | Thoma | 415/458 X |

FOREIGN PATENT DOCUMENTS

| | | | |
|---|---|---|---|
| 987325 | 4/1951 | France | 417/569 |

*Primary Examiner*—Robert G. Nilson

[57] ABSTRACT

A combined delivery and damping valve unit for a fuel system of a compression ignition engine comprises a body having a bore including a wider portion and a narrower portion. A spring abutment for the spring biasing the delivery valve member serves as a seating for a damping valve member. The abutment is retained against the step defined between the wider and narrower portions of the bore by locking members having a wedge section and biased by a spring.

3 Claims, 1 Drawing Figure

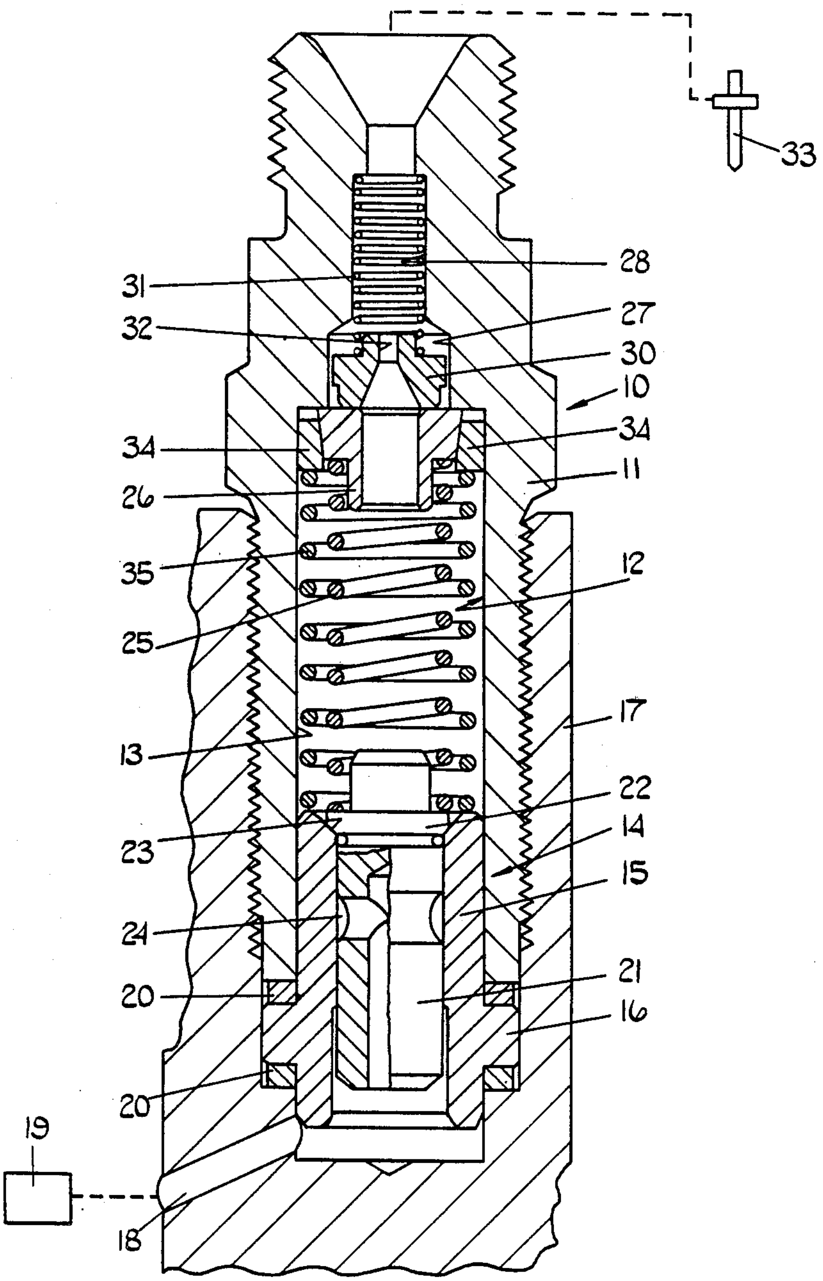
33
28
31
27
32
30
10
34
34
11
26
35
12
25
17
13
22
23
14
15
24
21
20
16
20
19
18

VALVE FOR FUEL PUMPING APPARATUS

This invention relates to a combined delivery valve and damping valve unit for connection in use, between an outlet of a high pressure fuel injection pump and a pipe line which leads to the associated fuel injection nozzle of a fuel system for a compression ignition engine.

The delivery valve and the damping valve are connected in series with the delivery valve being upstream of the damping valve. The duty of the delivery valve is well known, its purpose being to close as quickly as possible upon cessation of the delivery of fuel by the injection pump although, many delivery valves are of the so called unloading type which permit a predetermined volume of fuel to flow back towards the injection pump before they close. The duty of the damping valve is to damp the shock waves in the column of fuel between the delivery valve and the nozzle to avoid, so far as is possible, so called secondary injection of fuel to the engine. The damping valve usually comprises a spring loaded non-return valve which is opened during delivery of fuel to the nozzle, but which closes as soon as this flow of fuel ceases. In parallel with the non-return valve is a restricted passage.

It is convenient to house the delivery valve and damping valve in a single unit which can then be secured in an outlet of the injection pump. In one construction the combined unit comprises an elongated body in which is formed a stepped axial bore. The narrower end of the bore is in use connected to the pipe line and for this purpose the bore is flared and the body provided with a screw thread to receive a pipe connector. The other end portion of the body is also threaded so that it can be secured within the outlet of the pump and located within the bore at this end is a delivery valve body in the form of a sleeve extending within the bore. Mounted within the sleeve is a delivery valve member. The delivery valve member has a head which is biassed into contact with a seating on the sleeve by a valve spring. The valve spring at its end remote from the valve member engages an abutment. The damping valve includes a seating and a spring loaded valve member, both of which are located in a reduced portion of the bore, the seating being held within the reduced portion of the bore by deforming the step defined between the reduced portion of the bore and the portion of the bore containing the delivery valve.

The deformation of the step to retain the seating of the damping valve is an expensive and uncertain operation, and the object of the present invention is to provide a construction of the combined delivery valve and damping valve unit in a simple and convenient form.

According to the invention a combined delivery valve and damping valve unit comprises an elongated body having a stepped bore defined therein, a delivery valve assembly located in the wider portion of the bore, a spring abutment engaging a step defined between the wider portion of the bore and a reduced portion thereof, a damping valve member located in the reduced portion of the bore, said damping valve member when in use delivery of fuel has ceased, being urged into contact with a seating defined on said spring abutment, said spring abutment having a peripheral surface which tapers outwardly towards said step, at least one locking member having a wedge section located between said tapered surface and the wall of the bore and resilient means biassing said locking member towards said step.

An example of a combined delivery valve damping valve unit in accordance with the invention will now be described with reference to the accompanying drawing which is a cross sectional side elevation of the unit.

Referring to the drawing the combined unit is indicated at 10 and it comprises an elongated body 11 having a stepped axial bore generally indicated at 12, formed therein. The wider portion of the bore indicated at 13 accommodates a delivery valve assembly 14 and this comprises a delivery valve body 15 in the form of a sleeve having a flange 16. The elongated body 11 is provided with a peripheral screw thread whereby it can be screwed into a complementarily screw threaded recess formed in the housing 17 of the injection pump. Communicating with the recess at its inner end, is a fuel inlet 18 which during delivery of fuel communicates with an injection pump generally indicated at 19.

When the elongated body 11 is screwed into the recess, the flange 16 of the delivery valve body is sandwiched between the step defined adjacent the base of the recess and the end of the elongated body 11, suitable washers 20 being provided to assure a fuel tight seal.

Located within the bore in the delivery valve body is a delivery valve member 21 which has a head 22 which is shaped to co-operate with a seating 23 defined at the end of the bore in the delivery valve body which lies within the bore 13. The delivery valve body is provided with a circumferential groove 24 which communicates by way of a passage in the valve member 21 with the inlet 18.

The valve member is biassed by a coiled compression spring 25 one end of which engages the delivery valve body and the other end of which is engaged with a spring abutment 26. The spring abutment is urged against a step defined between the wider portion 13 of the bore 12 and a narrower portion 27. The narrower portion 27 of the bore connects with a further narrower portion 28 and located in the narrower portion 27 of the bore is a damping valve member 30. The valve member 30 in this example is biassed into contact with a seating surface defined on the abutment 26, by means of a coiled compression spring 31 accommodated in the portion 28 of the bore. The damping valve member is provided with a passage extending therethrough a portion 32 of which defines a restriction. In operation, when fuel is supplied by the injection pump, the delivery valve member 21 is moved against the action of its spring and during such movement fuel is displaced from the portion 13 of the bore past the damping valve member 30 into the portion 28 of the bore and from this portion of the bore to an injection nozzle which is generally indicated at 33. During this displacement of fuel the valve member 30 may be lifted away from the abutment 26. As the delivery valve member continues to move the circumferential groove 24 will be exposed beyond the wall of the bore in the delivery valve body and flow of fuel will occur into the portion 13 of the bore. During the delivery of fuel the valve member 30 will be lifted from its seating to allow substantially unrestricted flow of fuel.

When the delivery of fuel by the injection pump 19 ceases and the pump moves to permit return flow of fuel, the valve member 30 will immediately move onto its seating to restrict the rate at which fuel can return from the pipe line to the nozzle and the delivery valve will control the quantity of fuel in the usual manner.

It is necessary to retain the spring abutment against the step defined between the portions 13 and 27 of the bore and for this purpose the peripheral surface of the spring abutment tapers outwardly towards the aforesaid step. Engaging with the tapered surface is at least one locking member having a wedge section. In the particular example two locking members 34 of part annuar form are provided and they are biassed towards the step by a resilient means in the form of a coiled spring which is indicated at 35. As shown the spring which is indicated at 35. As shown the spring is formed from wire of circular section however, other forms of spring may be utilized, for example a convoluted tube. The angle of the co-operating surfaces of the abutment and the locking members are chosen so that the locking members lock in position under the influence of the spring and as assisted by the slight dilation of the body 11 which occurs when fuel is supplied by the pump 19. As the body dilates the locking members will be moved towards the step and will firmly grip the wall of the portion 13 of the bore.

The valve unit described is particularly simple to assemble and no machining operation is required once the parts have been placed in position. The movement of the locking members towards the step is completed after a few operations of the injection pump and the spring abutment 26 is firmly held against the step. If the spring abutment were not held then it might be possible for a shock wave returning along the pipe line from the injection nozzle, to lift the abutment away from the step and thereby reduce the damping effect provided by the damping valve.

It will be understood that more than two locking members may be provided and it is also possible providing the tolerences are carefully controlled to use a single locking member in the form of a ring having a wedge section.

I claim:

1. A combined delivery valve and damping valve unit for connection in use, between an outlet of a high pressure fuel injection pump and a pipeline which leads to the associated fuel injection nozzle of a fuel system for a compression ignition engine, the valve unit comprising an elongated body having a stepped bore defined therein, a delivery valve assembly located in the wider portion of the bore, a spring abutment engaging a step defined between the wider portion of the bore and a reduced portion thereof, a damping valve member located in the reduced portion of the bore, a seating defined on said spring abutment for engagement by said damping valve member, said spring abutment having a peripheral surface which tapers outwardly towards said step, at least one locking member having a wedge section located between said tapered surface and the wall of the bore and resilient means biassing said locking member towards said step.

2. A valve unit according to claim 1 in which the locking member is in the form of a ring.

3. A valve unit according to claim 1 in which said delivery valve assembly includes a delivery valve body having a sleeve portion extending into the wider portion of the bore, said resilient means comprising a coiled compression spring acting between said locking member and said sleeve portion.

* * * * *